M. MOUL.
MACHINE FOR MAKING BUNGS.
APPLICATION FILED AUG. 25, 1908.

982,980.

Patented Jan. 31, 1911.
8 SHEETS—SHEET 1.

M. MOUL.
MACHINE FOR MAKING BUNGS.
APPLICATION FILED AUG. 25, 1908.

982,980.

Patented Jan. 31, 1911.
8 SHEETS—SHEET 3.

Witnesses

Inventor
Martin Moul
By

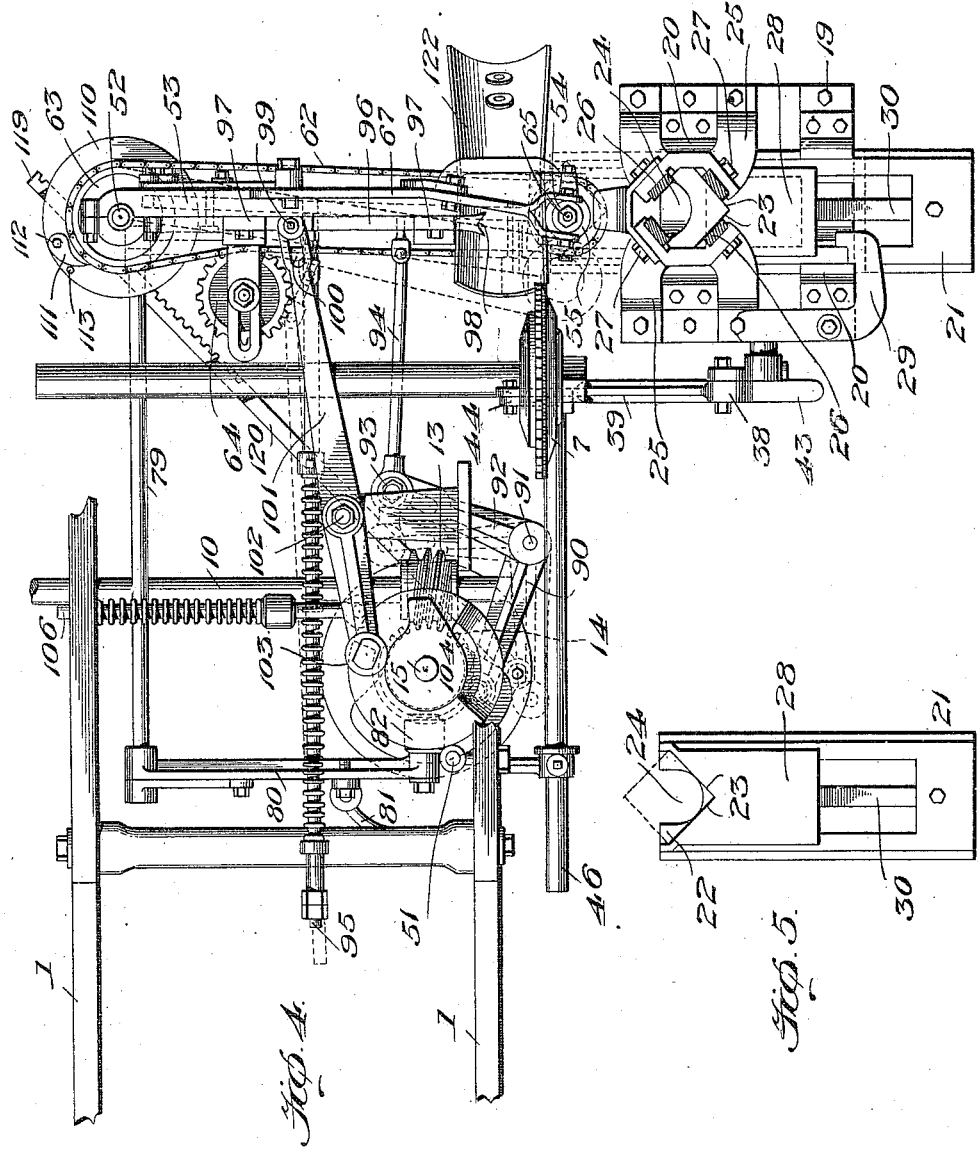

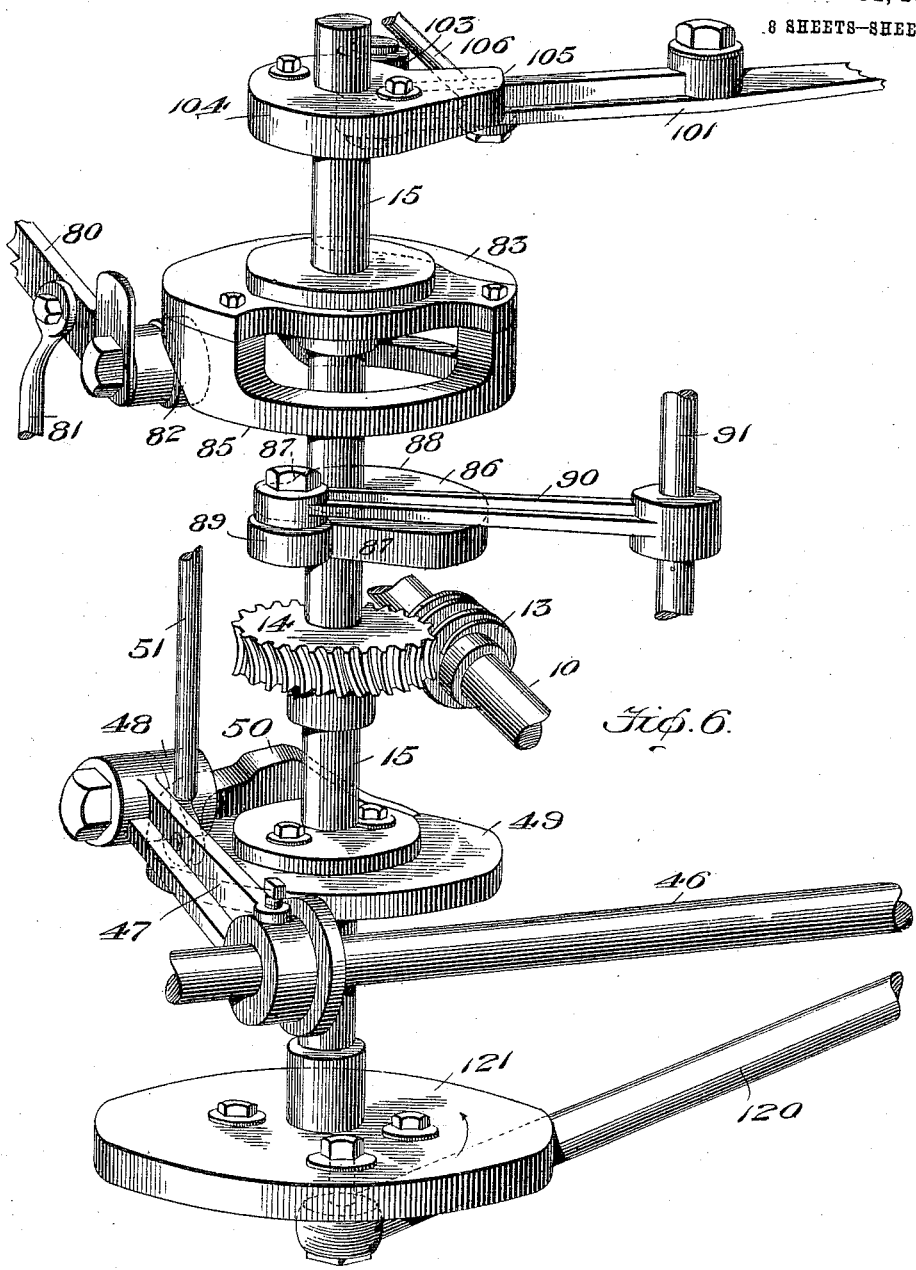

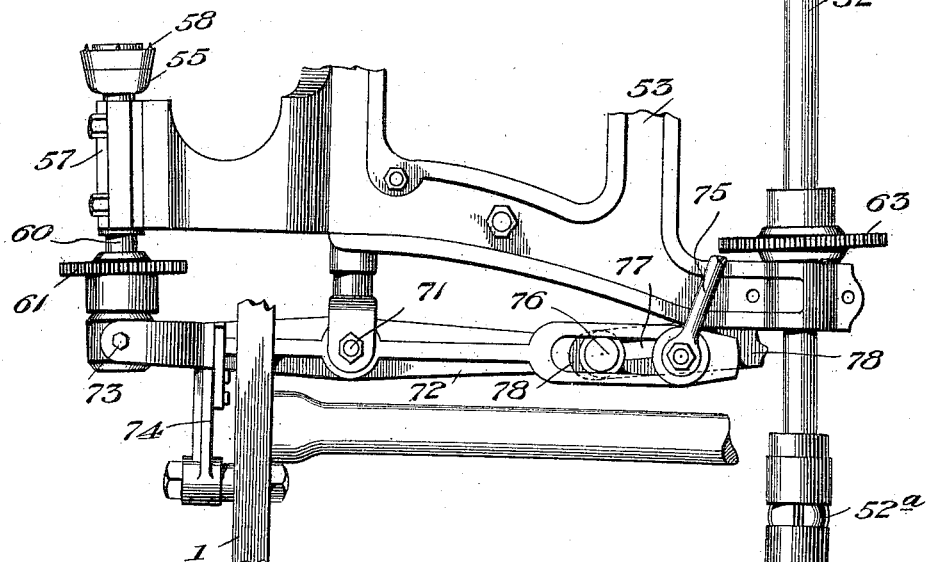

M. MOUL.
MACHINE FOR MAKING BUNGS.
APPLICATION FILED AUG. 25, 1908.
982,980.
Patented Jan. 31, 1911.
8 SHEETS—SHEET 7.
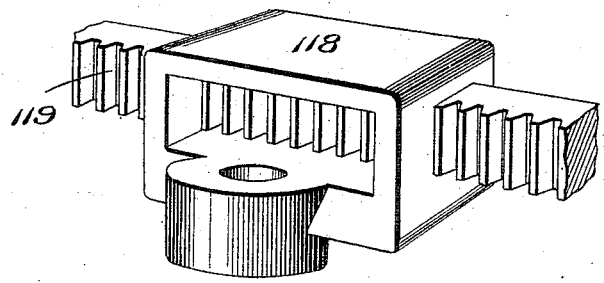
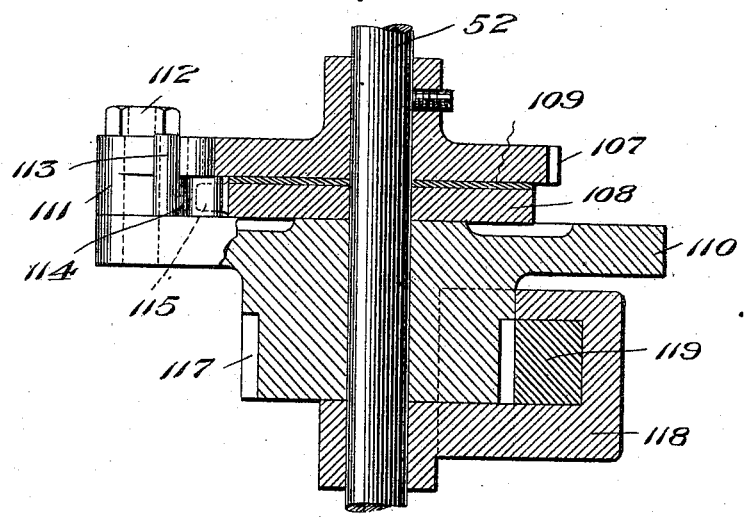
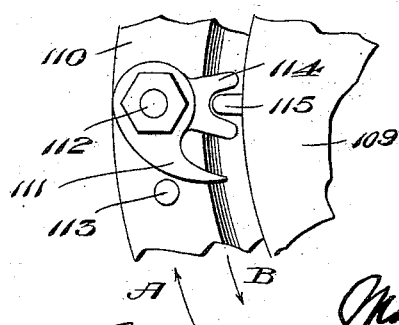

M. MOUL.
MACHINE FOR MAKING BUNGS.
APPLICATION FILED AUG. 25, 1908.
982,980.
Patented Jan. 31, 1911.
8 SHEETS—SHEET 8.
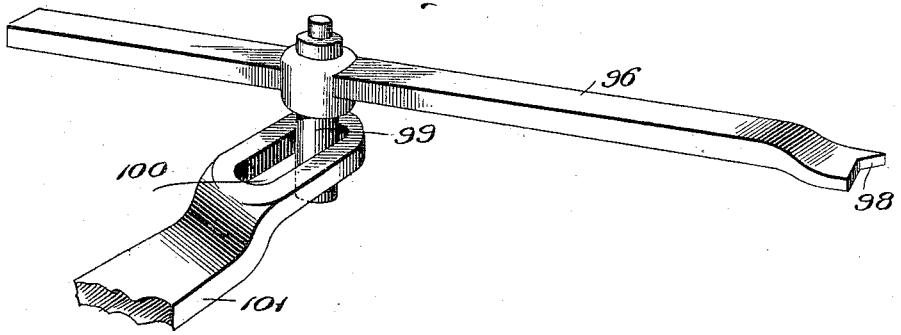
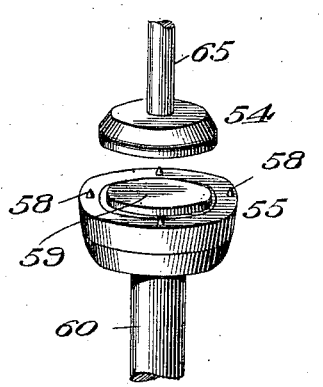
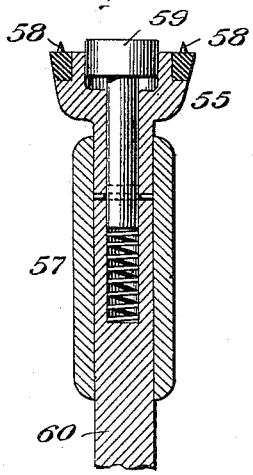
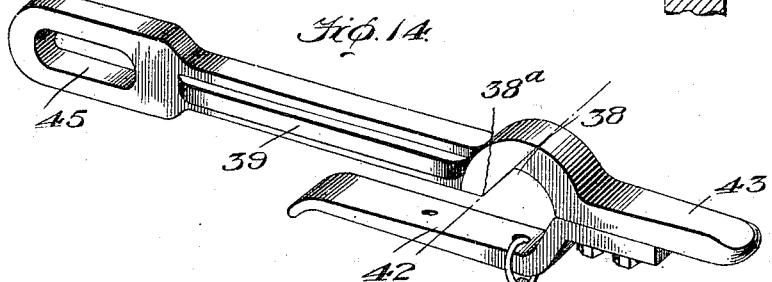
Witnesses
Inventor
Martin Moul
By
his Attorney

UNITED STATES PATENT OFFICE.

MARTIN MOUL, OF HANOVER, PENNSYLVANIA.

MACHINE FOR MAKING BUNGS.

982,980.  Specification of Letters Patent.  Patented Jan. 31, 1911.

Application filed August 25, 1908. Serial No. 450,150.

*To all whom it may concern:*

Be it known that I, MARTIN MOUL, a citizen of the United States, residing at Hanover, county of York, and State of Pennsylvania, have invented certain new and useful Improvements in Machines for Making Bungs, of which the following is a specification.

This invention relates to machines for making bungs.

The present invention has for its objects the provision of a machine of novel construction which will automatically manufacture bungs from flat blanks, previously cut into the desired shape in any preferred manner, carrying on the manufacture by a series of operations of certain novel instrumentalities consisting mainly of a feeder adapted to automatically feed the blanks one at a time, automatic gripping and centering devices adapted to grasp the blank as it is fed, a cutter, means for moving the gripping and centering device and the cutter in relation to each other to bring them into a predetermined relative position, and means for rotating the gripping device when the parts are in that position, whereby the cutter will round the blank into the shape of the bung, and for restoring the parts to normal position so that the completed bung is ejected and another bung fed to the centering and gripping devices.

In carrying out the foregoing objects, certain instrumentalities are provided which are set forth in detail hereinafter, but as a wide range of equivalent mechanical elements or appliances could be employed, I do not intend to limit my claims to the precise mechanical structures hereinafter described and set forth in the accompanying drawings, except where specified in the claims.

Figure 1:
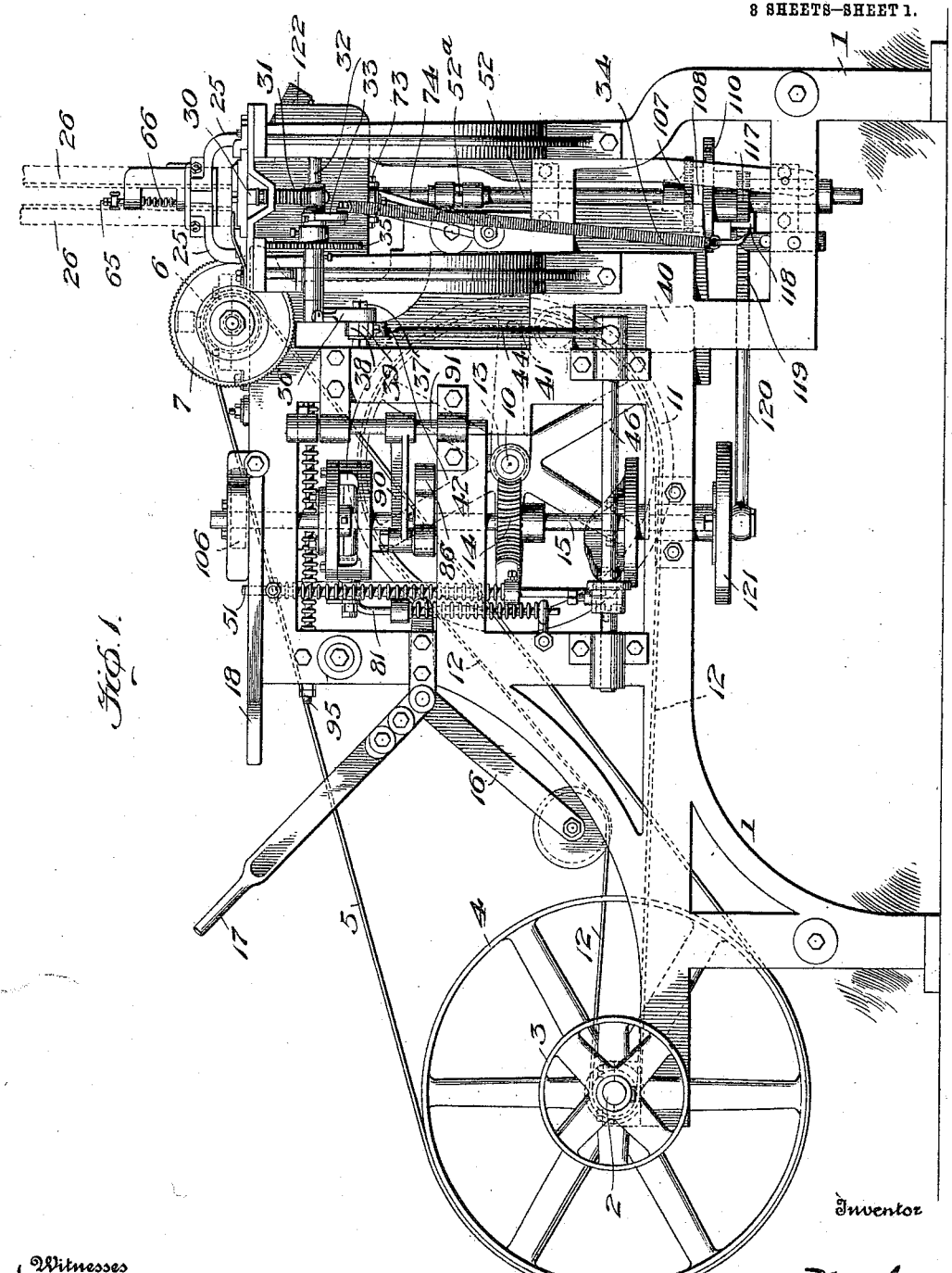
Figure 2:
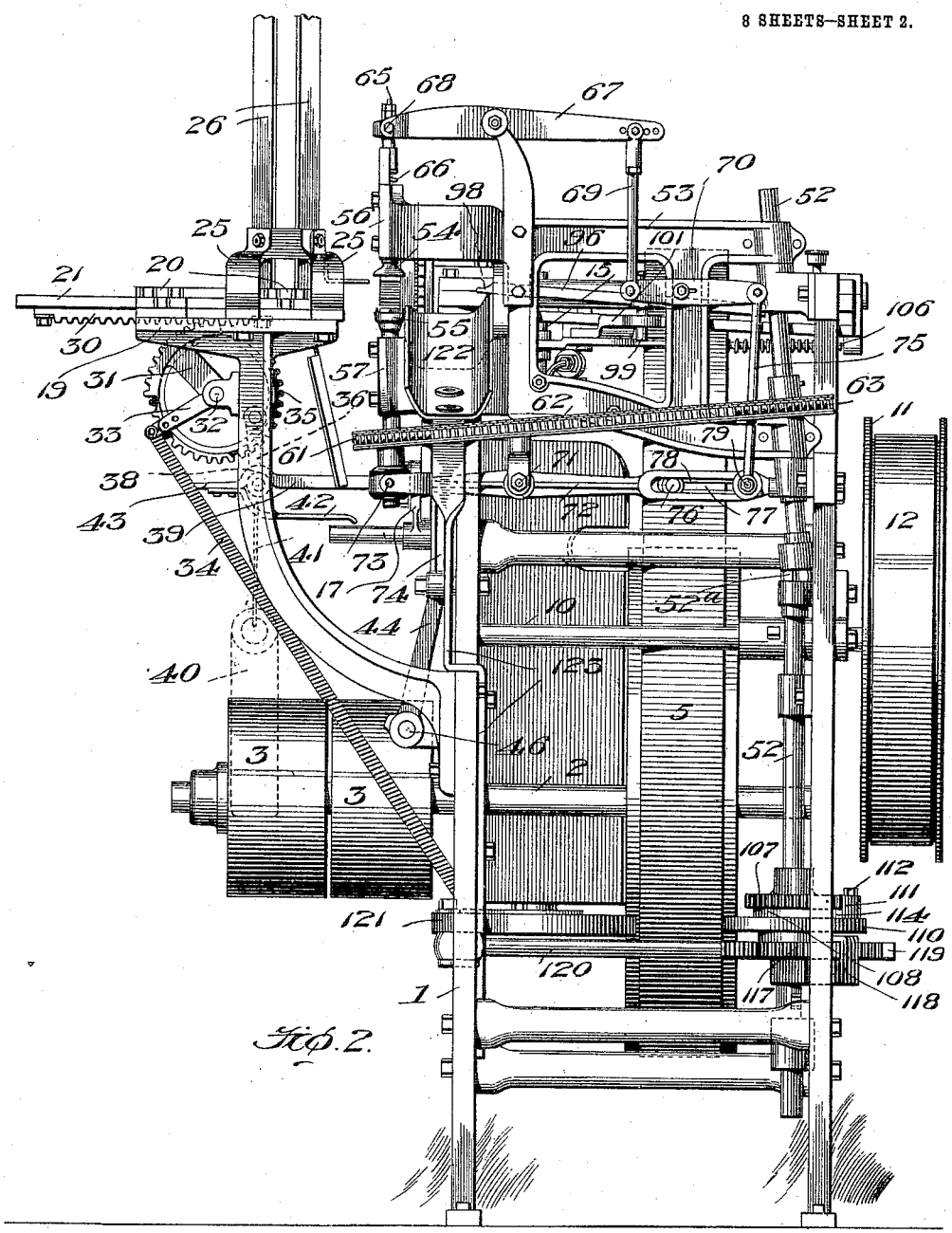
Figure 3:
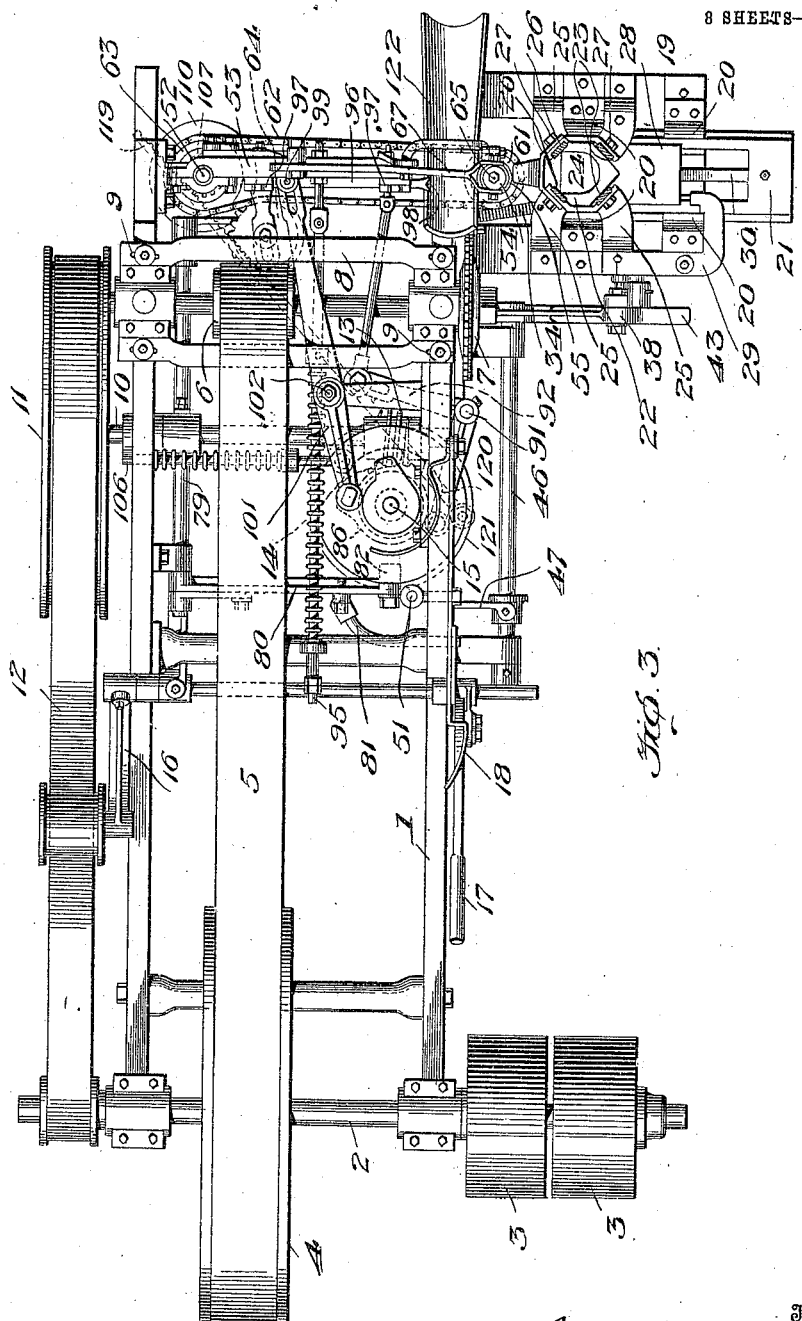

In the accompanying drawings:—Figure 1 is a side elevation; Fig. 2, an end elevation; Fig. 3, a plan, with the blank hopper or rack in section; Fig. 4, an enlarged detail plan of the principal parts of Fig. 3; Fig. 5, a detail plan of the feeder slide; Fig. 6, an enlarged detail perspective of the master or cam shaft and the various cams for operating the different mechanisms; Fig. 7, an enlarged detail end elevation of the lower part of the movable frame carrying the gripping mechanism, parts of the operating mechanism therefor, and the rack and pinion operating device; Figs. 8, 9 and 10, details of the rack, pinion and ratchet mechanism; Fig. 11, an enlarged detail of the dogging device; Figs. 12 and 13, enlarged details of the centering or gripping devices for the blank; and Fig. 14, a detail of the connecting rod which operates the feeder slide.

At one end of the frame 1 is the driving shaft 2 having fast and loose pulleys 3 to be belted to a suitable countershaft or motor and a main pulley 4 which is directly connected by belt 5 to the arbor 6 of a combined saw and cutter 7. This saw cuts and trims the blanks which are presented thereto by the centering or gripping mechanism hereinafter described. The arbor is carried by a box on a frame 8, which is adjustable transversely of the main frame by virtue of bolt and slot connections 9 thereto, whereby the saw and cutter may be differently positioned at different times to cut the bung to different desired diameters.

The remaining mechanisms of the machine are operated by a transverse shaft 10 carrying a belt pulley 11, which is connected by belt 12 to shaft 2, said shaft 10 having a worm 13 which meshes with a worm-wheel 14 on the master or cam shaft 15 (Fig. 6), whereby the various mechanisms are driven. A belt tightener 16, controlled by a lever 17 which may be hung up by a catch 18 affords means for quickly releasing or tensioning the belt 12, whereby all parts of the machine except the saw and cutter may be stopped or started.

*Blank feeding mechanism.*—Disposed at one side of the main frame, supported by brackets, is a bed 19 (Figs. 2, 3 and 4) having guideways 20, in which is adapted to slide, transversely of the machine, the feeder slide 21 (Fig. 5), the normal position of which is shown in Figs. 2, 3 and 4, and the advanced position delivering the blank to the gripping or centering mechanism, in dotted lines in Fig. 4. This feeder slide is provided with a blank holder 22, which is a recess in the top of the feeder having walls 23 which are disposed at right angles to each other, the bottom of the recess being cut out, as shown at 24, so that the centers of the gripping device may be received therein without contact with the feeder slide to enable the blank to be delivered with its center to the central part of the grippers or centerers. Overhanging the feeder slide are frames 25 which have seats to which the lower ends of hopper frame-pieces 26 are secured by bolts 27. The upward disposition of the frame-pieces is shown in Fig. 2, and the relative arrangement of these pieces is shown in Figs. 3 and 4. Together, the frame-pieces form a vertically arranged hopper, two of the sides of which coincide with the walls 23 of the seat or recess 22 of slide 21 when the latter is in retracted position so that the lowermost blank contained in the hopper will then be seated in the slide, as shown by dotted lines in Fig. 5. When the feeder slide advances to deliver the blank to the gripping and centering mechanism, the smooth top 28 of the feeder slide passes under and sustains the blanks in the hopper and on the return of the slide to normal position, the lowermost blank drops into the seat 22. To limit the outward movement of the feeder slide, a stop 29 (Figs. 3 and 4) is provided on the bed 19.

The feeder slide 21 is provided with a rack 30 on its lower face which is engaged by a racked rocker 31 secured to a rock-shaft 32 (Figs. 1 and 2), said shaft having an arm 33 to which a coil spring 34 connected to the frame 1, is attached, whose function is to retract the feeder slide. The rock-shaft 32 may carry a sprocket 35 for connection to a suitable register, if it is desired to register the number of blanks delivered by the feeder slide.

The rock-shaft 32 is provided with a slotted arm 36 (Figs. 1, 3, 4) in the slot of which is secured a wrist pin 37, with which is engaged the arch 38 of a connecting rod 39, which is normally held in such engagement by a weight 40 (Fig. 2) secured to a cord 41 (Fig. 14) which is attached to a lip 42. The connecting rod has a hand-piece 43 which may be grasped by the operator to pull the connecting rod outwardly so that further movement of the wrist pin 37 will cause it to disengage automatically from the wrist pin 37 when it is desired to stop the operation of the feeding mechanism, the lip 42 being then rested on the wrist pin.

One side 38ª of the arch 38 is inclined so that when an abnormal pressure is brought against the wrist-pin 37 caused by a choking up of the blanks in the hopper, said part 38ª will slide up on the pin and prevent further operation of the feeding mechanism, the lip 42 permitting the connecting rod 39 to rise no higher than may be required to cause its disengagement from the pin 37. The incline 38ª is of such degree that the weight 40 will, under normal conditions, cause it to engage the pin 37 and operate the feeder. The connecting rod is pivoted to a rocker 44 (Figs. 1, 2 and 4) by an adjustable bolt which passes through the slot 45 (Fig. 14) of the connecting rod, by means of which the throw of the connecting rod may be varied. The rocker arm 44 is secured to a rock-shaft 46 (Figs. 1, 3, 4 and 6), this rock-shaft being provided with an actuating arm 47 which has a bowl 48 adapted to coöperate with a cam 49 on the master shaft 15. The profile 50 of this cam forms less than one-half of the path of the bowl, thereby giving a comparatively long dwell so that the feeder slide 21 will remain stationary in the position shown in Figs. 1, 2, 3 and 4, while the operations of directing the blank to the saw or cutter, its trimming or cutting, and final return to normal position, are being carried on, and the cam profile is such that the feeder slide relatively rapidly advances, dwells until the centerer or gripper can grasp the blank, and then relatively rapidly retreats. To keep the bowl on the cam, there is provided a spring-depressed rod 51 (Figs. 1, 3, 4 and 6).

*Blank centering and gripping, dogging, and transferring mechanisms.*— Disposed vertically and journaled in suitable bearings on the frame 1 is a shaft 52 (Figs. 2, 4 and 7) on which is hinged a frame 53 whose free end which is disposed adjacent the blank hopper, is adapted to swing toward the saw and cutter, as shown by dotted lines in Fig. 4 for the purpose of presenting the blank to said saw and cutter. The upper and lower parts of the free end of this frame carry the combined centering and gripping devices 54 and 55 (Fig. 12), both of which are slidable vertically in bearings 56 and 57. The lower gripping and centering device 55 has points 58 to engage the blank and is provided with a spring-actuated blank-ejecting center 59, which is depressed when the blank is centered, but when the grippers are separated after the blank has been sawed into tapering form, releases the finished bung from its engagement with the points (Fig. 13). The lower gripping device 55 is carried by a spindle 60 journaled and slidable in the bearing 57 and carries a sprocket wheel 61, which is connected by a sprocket chain 62 to a sprocket wheel 63 on the vertically arranged shaft 52. Having its bearing adjustably carried on the frame 1 so that it may be moved toward or away from the inner stretch of the sprocket chain 62, is an idler sprocket wheel 64 which tends to tighten the sprocket chain as the frame 53 swings toward the saw and cutter. The upper gripper 54 is carried by a stem 65, which is suitably journaled so that the gripper and stem may turn with the blank and lower gripper and centerer 55. Surrounding the stem 65 and bearing against a shoulder thereon and also bearing on the frame 1 is a coil spring 66 whose function is to raise the gripper 54.

Pivoted to an upwardly extending arm on the swinging frame 53 is a lever 67 (Figs. 2, 3 and 4) which has a swiveled connection 68 with the stem 65 at one end, and its other end is connected by a rod 69 to a rocker 70

(Fig. 2). Pivoted at 71 to the lower part of the swinging frame 53 is a lever 72, which has a yoke which is swiveled at 73 to the lower end of the spindle 60. A rocker 74 journaled to the frame 1, (Figs. 1 and 7) which has a forked end coöperating with the outer end of the lever 72 when the frame 53 swings to and fro steadies and braces said lever when the bung is being trimmed. The rocker 70 is connected by a rod 75 to the slotted inner end of the lever 72, whereby the levers 67 and 72 simultaneously operate to cause simultaneous raising of the lower gripper and depression of the upper gripper or simultaneous separation thereof. The adjustable connection between the rod 75 and lever 72 affords means for changing the relative movement of the grippers, and the slot in the lever 72 receives a wrist pin 76 adjustably carried in the slot 77 in the rocker arm 78 (Fig. 7) carried by rock-shaft 79 which runs lengthwise of the frame 1 (Fig. 3) and is provided with an arm 80 pressed upwardly by a spring actuated rod 81 (Fig. 1) and provided with a bowl 82 which coöperates with a cam 83 (Fig. 6) having a profile provided with sharp inclines which are adapted to cause relatively quick depression of arm 80 and consequent relative rapid chucking of the blank between the centerers and grippers when the blank is presented thereto, and to cause relatively rapid separation of said grippers or centerers, the dwell part 85 of this cam being of relatively great length so that the bowl 82 will remain on said dwell during the time the swinging frame 53 is moved to bring the blank in position to be cut by the saw and cutter and while the grippers and centerers have rotated sufficiently when the blank is thus presented to the saw and cutter to insure trimming of said blank into the desired tapered cylindrical form, it being understood from an inspection of Fig. 2 that the upper part of the shaft 52 is inclined and connected to the lower part thereof by the coupling 52$^a$, such inclination causing corresponding inclination of the swinging frame 53 and the centerers and grippers.

Referring to Fig. 6, there is a cam 86 secured to the shaft 15, said cam having two inclined faces 87 and an arc-shaped dwell 88 on the said cam coöperating with a bowl 89 carried by an arm 90 on a rock-shaft 91 (Fig. 1) journaled in suitable bearings at the side of the frame 1 and also carrying an arm 92 (Figs. 3 and 4) which has an adjustable connection 93 with a connecting rod 94 attached to the swinging frame 53. The inclines 87 of the cam 86 (Fig. 6) by coöperation with the bowl 89 cause the swinging of the frame 53 toward and away from the saw and cutter and the dwell 88 is of such length that it will cause the retention of the swinging frame in the cutting position shown in dotted lines in Fig. 4 as long as may be necessary for the centerers 54 and 55 to perform a complete revolution so that the blank will be cut and trimmed all the way around before the retreat of the frame 53 to normal position, which is caused by the action of a spring-actuated rod 95 (Figs. 3 and 4).

When the blank is delivered by the feeder slide 21 to the centerers and grippers, it is desirable to dog the blank so that it may not become displaced. The dogging device is shown in detail in Fig. 11, and its operating mechanisms in Figs. 3, 4 and 6. The dog consists of a slidable bar 96 mounted in guides 97 on the inner side of the swinging frame 53, said dog having an angular notch 98 adapted to receive the corner of the blank delivered to the centerers and grippers when said blank is in proper position to be gripped. The dog has an adjustable pin 99 which is received in an elongated slot 100 of an actuating lever 101, which is pivoted at 102 and carries at its opposite end a bowl 103 adapted to be engaged by a wiper cam 104 on the master shaft 15, the wiper or toe of said cam being adapted to cause a relatively quick advance of the dog when the blank is in proper position to be dogged, said cam having a relatively short dwell 105 so that immediately the feeder slide begins to retreat; the dog does likewise. The slot 100 permits the swinging of the frame 53 toward the saw and cutter without operation of the dog. The bowl 103 of the lever 101 is held against the cam by a spring-actuated rod 106.

*Mechanism for rotating the centerers and grippers.*—Referring to Figs. 7 to 10, there is rigidly secured to the shaft 52 a ratchet wheel 107, below which is a loose friction disk 108 having a friction facing 109 which bears against the under side of the ratchet wheel 107. Journaled on shaft 52 is a disk 110 carrying a pawl 111, which is pivoted on a pin 112 whose outward throw is limited by a stop pin 113, said pawl having a bifurcated heel 114 into which a fin 115 on the friction disk 108 fits. Below and formed integral with the disk 110 is a pinion 117, below which is loosely journaled on the shaft 52 a rack guide 118, a portion of which receives a part of the periphery of the pinion 117 and rests upon a bearing 118$^a$ on the shaft 52 (Fig. 7). Slidable through the rack guide and in mesh with pinion 117, is a rack 119 on a rod 120, which is connected to a crank disk 121 (Fig. 6) secured to the master shaft 15. During the movements of the feeder slide, the dogging device, and the centering and gripping devices, and until the return to normal position of the feeder slide and the dog, the travel of the crank disk 121 in the direction of the arrow, Fig. 6, is such as to bring the rod 120 into substantially dead center with the master shaft 15, the coöperation of the rack 119 with the pinion 117 causing rotation of the disk 110 in the direction of the arrow A of Fig. 10, the pawl 111 riding idly on the ratchet wheel 107, there having been no occasion for the rotation of the gripper 55, but subsequent performance of the cycles of operations, causes the swinging frame 53 to be pulled toward the position shown by dotted lines in Fig. 4 by the rotation of the cam 86. Continued rotation of the shaft 15 causes the disk 121 to pull the rod 120 around farther so that it will rotate the pinion 117 in reverse direction to its former movement. The reverse movement of the pinion causes a reverse movement of the disk 110, and the friction disk 108, being loose on the shaft 52, the friction facing 109, by its engagement with the face of the ratchet wheel 107, causes an arrest of said friction disk so that there is a slight movement of the disk 110 in relation thereto, and as the fin on the friction disk remains stationary, the coöperation of the fin 115 with the heel 114 on the pawl 111 causes said pawl to be thrown into engagement with the ratchet wheel. At this point the blank gripped between the grippers is in position to be cut and trimmed by the saw and cutter. Continued retraction of the rod 120 causes the ratchet wheel, and hence the shaft 52, to be turned in the direction indicated by the arrow B in Fig. 10, which causes rotation of the sprocket wheel 63 and, through the rotation of the sprocket chain 62, rotation of the centerer 55, the sprocket chain having been made taut by engagement with the idler sprocket wheel 64.

As previously explained, the dwell 88 of the cam 86 is of sufficient length so that the frame 53 remains where swung, the continued rotation of shaft 15 causing the rod 120 and pinion and pawl and ratchet wheel to continue their movements until the blank has been rotated a complete revolution in position for the blank to be completely trimmed by the saw and cutter until the rod 120 gets beyond its other dead center, whereupon the reverse movement of the said rod and its rack will cause the pawl to be kicked off of the ratchet wheel and, consequently, during the return of the swinging frame 53 to normal position and until a subsequent blank has been carried into position to be cut and trimmed, there will be no rotation of the centerer and gripper 55.

When the swinging frame 53 reaches normal position, the bowl of the operating lever rides off the dwell of the cam 83 and, consequently, the centerers and grippers separate to release the finished bung which is then automatically released from the points 58 by the blank ejecting center 59 and falls into a chute 122 which is secured to a bracket 123 rising from the main frame 1 and loosely overlapping the swinging frame 53 adjacent the centerer 55. The operations are then repeated automatically, a new blank being fed to the centerers and grippers immediately after the finished bung is released therefrom.

Having thus described my invention, what I claim as new and desire to secure by Letters Patent, is:—

1. In a machine for making bungs, the combination with a cutter, of a swinging frame movable toward and from the cutter, a pair of rotary grippers which are movable axially and are carried by the swinging frame, means for rotating the grippers and for moving them axially to engage the blank, a blank feeder, a dogging device carried by and movable in relation to the swinging frame, a pivoted lever having a yielding connection with the dogging device, whereby the frame is allowed to swing without interference toward the cutter, and a cam for operating said lever.

2. In a machine for making bungs, the combination with a cutter, of a swinging frame movable toward and from the cutter, a pair of rotary grippers which are movable axially and are carried by the swinging frame, means for rotating the grippers and for moving them axially to engage the blank, a blank feeder, a slidable dog carried by said swinging frame and adapted to engage the blank when in position to be gripped, a pivoted lever, a slot-and-pin connection between the lever and the slidable dog, whereby the frame is permitted to swing toward the cutter without interference, and a cam adapted to coöperate with the lever to advance and retreat the said dog.

3. In a machine for making bungs, the combination with a swinging frame, of a cutter, means for swinging the frame toward and away from the cutter, rotary and axially movable grippers carried by the swinging frame, independent levers pivoted to the swinging frame and connected, respectively, to the grippers for shifting said grippers axially, intermediate connections between said levers, whereby the respective grippers are simultaneously axially shifted, and means extraneous to the swinging frame adapted for operating said levers.

4. In a machine for making bungs, the combination with a swinging frame, of a cutter, means for swinging the frame toward and away from the cutter, rotary and axially movable grippers carried by the swinging frame, independent levers pivoted to the swinging frame and connected, respectively, to the grippers for shifting said grippers axially, intermediate connections between said levers, whereby the respective grippers are simultaneously axially shifted, one of the aforesaid levers having a slot, a (Fig. 2). Pivoted at 71 to the lower part of the swinging frame 53 is a lever 72, which has a yoke which is swiveled at 73 to the lower end of the spindle 60. A rocker 74 journaled to the frame 1, (Figs. 1 and 7) which has a forked end coöperating with the outer end of the lever 72 when the frame 53 swings to and fro steadies and braces said lever when the bung is being trimmed. The rocker 70 is connected by a rod 75 to the slotted inner end of the lever 72, whereby the levers 67 and 72 simultaneously operate to cause simultaneous raising of the lower gripper and depression of the upper gripper or simultaneous separation thereof. The adjustable connection between the rod 75 and lever 72 affords means for changing the relative movement of the grippers, and the slot in the lever 72 receives a wrist pin 76 adjustably carried in the slot 77 in the rocker arm 78 (Fig. 7) carried by rock-shaft 79 which runs lengthwise of the frame 1 (Fig. 3) and is provided with an arm 80 pressed upwardly by a spring actuated rod 81 (Fig. 1) and provided with a bowl 82 which coöperates with a cam 83 (Fig. 6) having a profile provided with sharp inclines which are adapted to cause relatively quick depression of arm 80 and consequent relative rapid chucking of the blank between the centerers and grippers when the blank is presented thereto, and to cause relatively rapid separation of said grippers or centerers, the dwell part 85 of this cam being of relatively great length so that the bowl 82 will remain on said dwell during the time the swinging frame 53 is moved to bring the blank in position to be cut by the saw and cutter and while the grippers and centerers have rotated sufficiently when the blank is thus presented to the saw and cutter to insure trimming of said blank into the desired tapered cylindrical form, it being understood from an inspection of Fig. 2 that the upper part of the shaft 52 is inclined and connected to the lower part thereof by the coupling 52ª, such inclination causing corresponding inclination of the swinging frame 53 and the centerers and grippers.

Referring to Fig. 6, there is a cam 86 secured to the shaft 15, said cam having two inclined faces 87 and an arc-shaped dwell 88 on the said cam coöperating with a bowl 89 carried by an arm 90 on a rock-shaft 91 (Fig. 1) journaled in suitable bearings at the side of the frame 1 and also carrying an arm 92 (Figs. 3 and 4) which has an adjustable connection 93 with a connecting rod 94 attached to the swinging frame 53. The inclines 87 of the cam 86 (Fig. 6) by coöperation with the bowl 89 cause the swinging of the frame 53 toward and away from the saw and cutter and the dwell 88 is of such length that it will cause the retention of the swinging frame in the cutting position shown in dotted lines in Fig. 4 as long as may be necessary for the centerers 54 and 55 to perform a complete revolution so that the blank will be cut and trimmed all the way around before the retreat of the frame 53 to normal position, which is caused by the action of a spring-actuated rod 95 (Figs. 3 and 4).

When the blank is delivered by the feeder slide 21 to the centerers and grippers, it is desirable to dog the blank so that it may not become displaced. The dogging device is shown in detail in Fig. 11, and its operating mechanisms in Figs. 3, 4 and 6. The dog consists of a slidable bar 96 mounted in guides 97 on the inner side of the swinging frame 53, said dog having an angular notch 98 adapted to receive the corner of the blank delivered to the centerers and grippers when said blank is in proper position to be gripped. The dog has an adjustable pin 99 which is received in an elongated slot 100 of an actuating lever 101, which is pivoted at 102 and carries at its opposite end a bowl 103 adapted to be engaged by a wiper cam 104 on the master shaft 15, the wiper or toe of said cam being adapted to cause a relatively quick advance of the dog when the blank is in proper position to be dogged, said cam having a relatively short dwell 105 so that immediately the feeder slide begins to retreat, the dog does likewise. The slot 100 permits the swinging of the frame 53 toward the saw and cutter without operation of the dog. The bowl 103 of the lever 101 is held against the cam by a spring-actuated rod 106.

*Mechanism for rotating the centerers and grippers.*—Referring to Figs. 7 to 10, there is rigidly secured to the shaft 52 a ratchet wheel 107, below which is a loose friction disk 108 having a friction facing 109 which bears against the under side of the ratchet wheel 107. Journaled on shaft 52 is a disk 110 carrying a pawl 111, which is pivoted on a pin 112 whose outward throw is limited by a stop pin 113, said pawl having a bifurcated heel 114 into which a fin 115 on the friction disk 108 fits. Below and formed integral with the disk 110 is a pinion 117, below which is loosely journaled on the shaft 52 a rack guide 118, a portion of which receives a part of the periphery of the pinion 117 and rests upon a bearing 118ª on the shaft 52 (Fig. 7). Slidable through the rack guide and in mesh with pinion 117, is a rack 119 on a rod 120, which is connected to a crank disk 121 (Fig. 6) secured to the master shaft 15. During the movements of the feeder slide, the dogging device, and the centering and gripping devices, and until the return to normal position of the feeder slide and the dog, the travel of the crank disk 121 in the direction of the arrow, Fig. 6, is such as to bring the rod 120 into substantially dead center with the master shaft 15, the coöperation of the rack 119 with the pinion 117 causing rotation of the disk 110 in the direction of the arrow A of Fig. 10, the pawl 111 riding idly on the ratchet wheel 107, there having been no occasion for the rotation of the gripper 55, but subsequent performance of the cycles of operations, causes the swinging frame 53 to be pulled toward the position shown by dotted lines in Fig. 4 by the rotation of the cam 86. Continued rotation of the shaft 15 causes the disk 121 to pull the rod 120 around farther so that it will rotate the pinion 117 in reverse direction to its former movement. The reverse movement of the pinion causes a reverse movement of the disk 110, and the friction disk 108, being loose on the shaft 52, the friction facing 109, by its engagement with the face of the ratchet wheel 107, causes an arrest of said friction disk so that there is a slight movement of the disk 110 in relation thereto, and as the fin on the friction disk remains stationary, the coöperation of the fin 115 with the heel 114 on the pawl 111 causes said pawl to be thrown into engagement with the ratchet wheel. At this point the blank gripped between the grippers is in position to be cut and trimmed by the saw and cutter. Continued retraction of the rod 120 causes the ratchet wheel, and hence the shaft 52, to be turned in the direction indicated by the arrow B in Fig. 10, which causes rotation of the sprocket wheel 63 and, through the rotation of the sprocket chain 62, rotation of the centerer 55, the sprocket chain having been made taut by engagement with the idler sprocket wheel 64.

As previously explained, the dwell 88 of the cam 86 is of sufficient length so that the frame 53 remains where swung, the continued rotation of shaft 15 causing the rod 120 and pinion and pawl and ratchet wheel to continue their movements until the blank has been rotated a complete revolution in position for the blank to be completely trimmed by the saw and cutter until the rod 120 gets beyond its other dead center, whereupon the reverse movement of the said rod and its rack will cause the pawl to be kicked off of the ratchet wheel and, consequently, during the return of the swinging frame 53 to normal position and until a subsequent blank has been carried into position to be cut and trimmed, there will be no rotation of the centerer and gripper 55.

When the swinging frame 53 reaches normal position, the bowl of the operating lever rides off the dwell of the cam 83 and, consequently, the centerers and grippers separate to release the finished bung which is then automatically released from the points 58 by the blank ejecting center 59 and falls into a chute 122 which is secured to a bracket 123 rising from the main frame 1 and loosely overlapping the swinging frame 53 adjacent the centerer 55. The operations are then repeated automatically, a new blank being fed to the centerers and grippers immediately after the finished bung is released therefrom.

Having thus described my invention, what I claim as new and desire to secure by Letters Patent, is:—

1. In a machine for making bungs, the combination with a cutter, of a swinging frame movable toward and from the cutter, a pair of rotary grippers which are movable axially and are carried by the swinging frame, means for rotating the grippers and for moving them axially to engage the blank, a blank feeder, a dogging device carried by and movable in relation to the swinging frame, a pivoted lever having a yielding connection with the dogging device, whereby the frame is allowed to swing without interference toward the cutter, and a cam for operating said lever.

2. In a machine for making bungs, the combination with a cutter, of a swinging frame movable toward and from the cutter, a pair of rotary grippers which are movable axially and are carried by the swinging frame, means for rotating the grippers and for moving them axially to engage the blank, a blank feeder, a slidable dog carried by said swinging frame and adapted to engage the blank when in position to be gripped, a pivoted lever, a slot-and-pin connection between the lever and the slidable dog, whereby the frame is permitted to swing toward the cutter without interference, and a cam adapted to coöperate with the lever to advance and retreat the said dog.

3. In a machine for making bungs, the combination with a swinging frame, of a cutter, means for swinging the frame toward and away from the cutter, rotary and axially movable grippers carried by the swinging frame, independent levers pivoted to the swinging frame and connected, respectively, to the grippers for shifting said grippers axially, intermediate connections between said levers, whereby the respective grippers are simultaneously axially shifted, and means extraneous to the swinging frame adapted for operating said levers.

4. In a machine for making bungs, the combination with a swinging frame, of a cutter, means for swinging the frame toward and away from the cutter, rotary and axially movable grippers carried by the swinging frame, independent levers pivoted to the swinging frame and connected, respectively, to the grippers for shifting said grippers axially, intermediate connections between said levers, whereby the respective grippers are simultaneously axially shifted, one of the aforesaid levers having a slot, a rocker mounted extraneously in relation to the said swinging frame and provided with a pin which is received in the slot aforesaid, whereby the swinging of the frame is not interfered with, and means for operating said rocker at a predetermined time.

5. In a machine for making bungs, the combination with a swinging frame, of a cutter, means for swinging the frame toward and away from the cutter, rotary and axially movable grippers carried by the swinging frame, independent levers pivoted to the swinging frame and connected, respectively, to the grippers for shifting said grippers axially, intermediate connections between said levers, whereby the respective grippers are simultaneously axially shifted, one of the aforesaid levers having a slot, a rocker mounted extraneously in relation to the said swinging frame and provided with a pin which is received in the slot aforesaid, whereby the swinging of the frame is not interfered with, a cam having a relatively long dwell, and a rod coöperating with said cam and connected to the rocker aforesaid, whereby the grippers are made to retain their bite on the blank until the swinging frame has moved to trimming position and returned to normal position.

6. In a machine for making bungs, the combination with a shaft, of a swinging frame mounted concentrically to said shaft, whereby it is adapted to swing on the same axis as the shaft, a rotary axially movable gripper carried by said swinging frame, wheels on the shaft and on the gripper, an endless driver running around said wheels, a lever carried by the swinging frame and cooperatively engaged with the axially movable gripper, a rocker extraneous to the swinging frame which has an adjustable connection with said lever, whereby the lever may be operated without interference with the swinging of the frame, and a cutter toward and away from which the frame is movable.

7. In a machine for making bungs, the combination with a blank gripper, of a movable blank feeder, a crank for moving said feeder to and fro, a wrist pin on said crank, a reciprocating connecting rod having means to engage the wrist pin and also provided with a lip between which and the connecting rod the pin is received, whereby said connecting rod may be disengaged from the wrist pin, and means for operating said connecting rod.

8. In a machine for making bungs, the combination with a blank gripper, of a movable blank feeder, a crank for moving said feeder to and fro, a wrist pin on said crank, a reciprocating connecting rod having a notch adapted to receive the wrist pin and so shaped that undue pressure will disengage the connecting rod from the wrist pin, a lip on the connecting rod between which and the rod the wrist pin is received, and means for operating said connecting rod.

9. In a machine for making bungs, the combination with a swinging frame, and a cutter toward and away from which the frame is movable, of a rotary gripper, a shaft, wheels on said shaft and gripper, an endless operating band connecting said wheels, means for swinging the frame, and an idler wheel stationarily positioned in relation to the swinging frame and located so that it will engage and tighten the band when the swinging frame is moved toward the cutter.

In testimony whereof, I hereunto affix my signature in presence of two witnesses.

MARTIN MOUL.

Witnesses:
OSCAR R. BOWMAN,
JULIUS W. FISCHER.